April 15, 1952     P. A. HALFPAP ET AL     2,592,688
FISHING POLE HOLDER
Filed Aug. 17, 1949
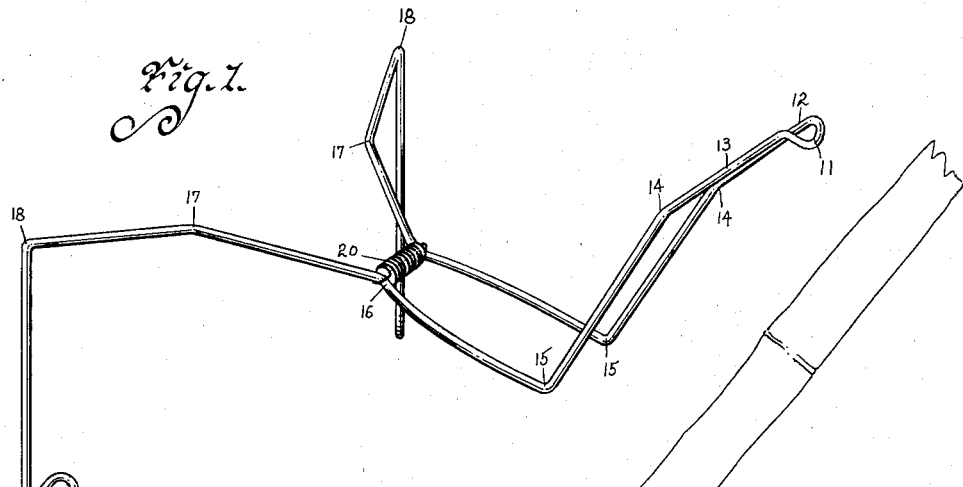
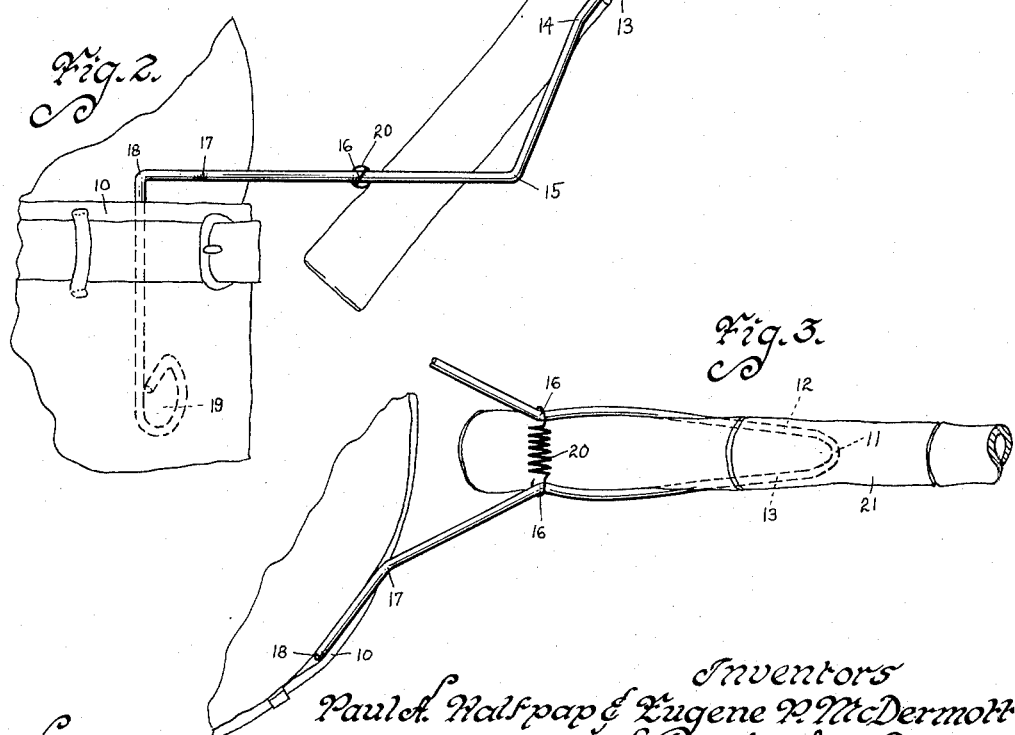
Inventors
Paul A. Halfpap & Eugene P. McDermott
by M. Talbert Dick
Attorney
Witness
Edward B. Lelley Patented Apr. 15, 1952

2,592,688

UNITED STATES PATENT OFFICE 2,592,688

FISHING POLE HOLDER

Paul A. Halfpap and Eugene P. McDermott,
Fort Dodge, Iowa

Application August 17, 1949, Serial No. 110,792

7 Claims. (Cl. 224—5)

The principal object of this invention is to provide a fishing pole holder that can be detachably secured to the fisherman's person and that will adequately support the pole, thereby leaving the fisherman the free and unhampered use of both hands for other purposes if desired or necessary.

A still further object of our invention is to provide a fishing rod or fishing pole holder for use on the person of the fisherman, that does not interfere with casting or the normal operation of the rod or pole when the holder is not in the actual use of holding the rod or pole.

A still further purpose of this device is to provide a fishing pole or rod holder that is designed to be capable of receiving and supporting poles of varying size diameters.

A still further object of this device is to provide a holder for fishing poles that is light in weight and when not in use may be carried either by hand or in a tackle box.

A still further purpose of this invention is to provide a fishing pole holder that is economical in manufacture, efficient in use and durable in use.

These and other objects will be apparent to those skilled in the art.

Our invention consists in the construction, arrangement, and combination of the various parts of the device, whereby the objects contemplated are attained as hereinafter more fully set forth, pointed out in our claims, and illustrated in the accompanying drawings, in which:

Fig. 1 is a perspective view of this device ready for use,

Fig. 2 is a side view of this device in use, shown supporting a fishing pole and with dotted lines indicating a portion of the holder in place inside the belt and trousers of a person, and Fig. 3 is a top view of a portion of the device taken from the line 3—3 of Fig. 2.

The usual method of fishing is to hold the pole or rod in the hand or hands. This is especially true in casting and fly fishing. The difficulty arises when there are other tasks to be performed by the hands, such as changing lures, flies, the removal of a caught fish from the hook and the use of the net. If the fisherman is on foot and in movement such as stream and shallow water fishing, he ofttimes is some distance from the bank. To free his hands he must try to hold the pole or rod under his arm or between his legs, which of course is most unsatisfactory. We have overcome such problems by providing a pole support to be worn on the fisherman and that permits rapid and easy attachment or detachment of the pole or the like.

Referring to the drawings, we have used the numeral 10 to designate the waist of a pair of trousers of a fisherman and which serves to illustrate the manner in which our device is used. An ordinary waist belt will serve the same purpose. Our device is made from a single strand of rod material. This rod is bent at its center to form the U-shaped support or cradle portion 11 and is bent forwardly at right angles to the rod lengths 12 and 13 which are spaced apart and extend downwardly, rearwardly and outwardly to the bend point 14, as shown in Fig. 1. At the bend points 14, the rod lengths 12 and 13 are bent and extend more sharply downwardly until they reach the bend points 15 respectively. From the bend points 15 each of the rod lengths 12 and 13 extend rearwardly and horizontally to the points 16 where each rod length 12 and 13 respectively are bent slightly inwardly towards each other, as shown in Fig. 1 and Fig. 3. From point 16 the rod lengths 12 and 13 extend rearwardly and outwardly away from each other to bend points 17 respectively, where each respective rod length 12 and 13 is bent outwardly away from each other at a sharper angle and extends to the bend points 18 respectively, as shown in Fig. 1. From the bend points 18 each of the rods is bent to extend vertically downwardly. The free end of each rod member is bent in a circle to form the bearing eyes 19, as shown in Fig. 1. A coil spring 20 provided with an eye on each end thereof is slidably, transversely arranged on this device at the bend points 16 by placing one of the eyes around each of the rod lengths 12 and 13 respectively, as shown in Fig. 1 and Fig. 3.

In operation this device is used as follows: The rear portion of this holder, consisting of the bearing eyes 19 on the respective free ends of rod lengths 12 and 13, are inserted behind the belt or trousers or behind both, on the person using it, as shown in Fig. 2. This may be done in front or at the side, as desired. In this position the front portion of this holder is in position to receive the pole 21. The bottom end portion of the pole 21 is placed between the rod lengths 12 and 13 and in the space between the bend points 15 and 16, as shown in Fig. 2. The bottom end of the pole 21 is passed diagonally under and engaging the spring 20 which serves as a yielding stop means to retard any upward movement of the bottom portion of the pole. The spring 20 further serves as a means for permitting poles of varying diameters to be inserted as just described. Furthermore, the spring yieldingly pulls the two rod lengths 12 and 13 toward each other, thereby yieldingly clamping the rod lengths onto and at each side of the pole. The pole is further rested within the U-shaped support portion 11, as shown in Fig. 2.

In this position the bearing eyes 19 will press against the body to maintain the holder in place. It will thus be seen that the pole is adequately supported and can be quickly grasped if necessary, or can be quickly and easily withdrawn from the holder. While the pole is in the holder as herein described, the hands of the fisherman are free to be used for other purposes beside the holding of the fishing pole or rod.

The bend points 18 limit the downward sliding of the device into the top of the trousers or belt. If desired the pole may be so inserted into and on over supporting device that the butt end of the pole may engage the body of the fisherman for additional support. With ordinary weight poles or rods, this however is not necessary. The removal of the pole of the device is accomplished instantaneously. It is merely necessary to grasp the pole, elevate it from engagement with the portion 11, and then lift the pole upwardly from between the rod lengths 12 and 13. It is as easily and quickly replaced. By the rear ends of the rod length being relatively widely spaced apart the device is more stable and will not cant when holding a pole.

Some changes may be made in the construction and arrangement of our fishing pole holder without departing from the real spirit and purpose of our invention, and it is our intention to cover by our claims, any modified forms of structure or use of mechanical equivalents which may be reasonably included within their scope.

We claim:

1. In a fishing pole holder, a rod member bent at its center to form a U-shaped support portion, the resulting two rod length portions then extending in spaced relation downwardly and rearwardly, thence horizontally rearwardly and outwardly away from each other, thence vertically downwardly, and a yielding means secured to said rod length portions for holding the same toward each other; said yielding means also capable of serving as a yielding stop means to retard the upwardly movement of a fishing pole passing between said two rod length portions and beneath said yielding means.

2. In a fishing pole holder, a spring rod member bent at its center to form a U-shaped support member; the resulting two rod length portions then extending in spaced relation downwardly and rearwardly, thence horizontally and rearwardly in spaced relation and bent inwardly towards each other to a reduced spaced relation point, thence outwardly away from each other and horizontally, thence downwardly, a bearing eye formed on the free end of each of said rod lengths and a yieldable means detachably slidably secured to each of said rod lengths at said reduced spaced relation point.

3. In a fishing pole holder, a spring rod member bent at its center to form a U-shaped support member; the resulting two rod length portions then extending in spaced relation downwardly and rearwardly, thence horizontally and rearwardly in spaced relation and bent inwardly towards each other to a reduced spaced relation point, thence outwardly away from each other and horizontally, thence downwardly, a bearing eye formed on the free end of each of said rod lengths and a yieldable means detachably slidably secured to each of said rod lengths at said reduced spaced relation point; said yielding means also capable of serving as a yielding stop means to retard the upwardly movement of a fishing pole passing between said two rod length portions and beneath said yielding means.

4. In a fishing pole holder, a resilient rod member bent at its center to form a U-shaped portion, the resulting two rod length portions then extending therefrom at substantially a right angle downwardly and rearwardly in spaced relation, thence horizontally and rearwardly to a reduced spaced relationship point, thence horizontally rearwardly away from each other, thence horizontally rearwardly away from each other at a greater angle than before, thence downwardly, a bearing portion formed on the free end of each of said rod length portions and a yielding means secured between and to each of said rod length portions at said reduced spaced relationship point.

5. In a fishing pole holder, a resilient rod member bent at its center to form a U-shaped portion, the resulting two rod length portions then extending therefrom at substantially a right angle downwardly and rearwardly in spaced relation, thence horizontally and rearwardly to a reduced spaced relationship point, thence horizontally rearwardly away from each other, thence horizontally rearwardly away from each other at a greater angle than before, thence downwardly, a bearing portion formed on the free end of each of said rod length portions and a yielding means secured between and to each of said rod length portions at said reduced spaced relationship point; said yielding means also capable of serving as a yielding stop means to retard the upwardly movement of a fishing pole passing between said two rod length portions and beneath said yielding means.

6. In a fishing pole holder, a fishing pole support comprising two spaced apart rod members joined at their forward ends with said forward end bent into a U-shaped cradle to serve as a supporting point for a fishing pole; said rod members extending from said U-shaped cradle first downwardly and rearwardly, thence horizontally rearwardly and away from each other and thence downwardly and a yieldable stop means extending between and secured to the horizontal portion of said rod members; said yieldable stop means capable of retarding the upwardly movement of fishing pole resting at one portion on said cradle and having one end passing downwardly between said rod members and transversely beneath said yieldable stop means.

7. In a fishing pole holder, a fishing pole support comprising two spaced apart rod members joined at their forward ends with said forward end bent into a U-shaped cradle to serve as a supporting point for a fishing pole; said rod members extending from said U-shaped cradle first downwardly and rearwardly, thence horizontally rearwardly and away from each other and thence downwardly and a yieldable stop means extending between and secured to the horizontal portion of said rod members; said yieldable stop means capable of retarding the upwardly movement of fishing pole resting at one portion on said cradle and having one end passing downwardly between said rod members and transversely beneath said yieldable stop means; said yieldable stop means also capable of yieldingly holding said rod members in spaced relationship whereby they may be moved away from each to receive fishing poles of varying diameter, and a bearing portion formed on the free end of each of said rod lengths.

PAUL A. HALFPAP.
EUGENE P. McDERMOTT.

REFERENCES CITED

The following references are of record in the file of this patent:

UNITED STATES PATENTS

| Number | Name | Date |
|---|---|---|
| 1,552,535 | Beerstecher | Sept. 8, 1925 |
| 1,788,536 | Merckel | Jan. 13, 1931 |
| 1,831,190 | Parker | Nov. 10, 1931 |
| 2,202,739 | Kilby | May 28, 1940 |
| 2,328,915 | Mayer | Sept. 7, 1943 |
| 2,487,094 | Brown | Nov. 8, 1949 |

FOREIGN PATENTS

| Number | Country | Date |
|---|---|---|
| 15,991 | Great Britain | Aug. 24, 1893 |